United States Patent
Watanabe et al.

(10) Patent No.: US 6,713,215 B2
(45) Date of Patent: Mar. 30, 2004

(54) NON-AQUEOUS ELECTROLYTE RECHARGEABLE BATTERIES

(75) Inventors: Shunji Watanabe, Sendai (JP); Toyoo Harada, Sendai (JP); Yoshimi Kanno, Sendai (JP); Shinichi Takasugi, Sendai (JP); Tsugio Sakai, Sendai (JP); Hideharu Onodera, Sendai (JP); Tsuneaki Tamachi, Sendai (JP)

(73) Assignee: Sii Micro Parts Ltd., Miyagi (JP)

( * ) Notice: Subject to any disclaimer, the term of this patent is extended or adjusted under 35 U.S.C. 154(b) by 0 days.

(21) Appl. No.: 09/765,550

(22) Filed: Jan. 19, 2001

(65) Prior Publication Data

US 2002/0068221 A1 Jun. 6, 2002

(30) Foreign Application Priority Data

Feb. 1, 2000 (JP) .......................................... 2000-023592
Aug. 1, 2000 (JP) .......................................... 2000-233035
Aug. 9, 2000 (JP) ....................................... 2000-0241335

(51) Int. Cl.$^7$ ................................................ H01M 4/58
(52) U.S. Cl. .............................. 429/231.5; 429/231.95; 429/218.1; 429/231.8; 429/341; 429/330; 429/323; 429/249
(58) Field of Search .......................... 429/231.5, 231.8, 429/218.1, 341, 330, 323, 249, 231.95

(56) References Cited

U.S. PATENT DOCUMENTS

| 5,427,874 A | * | 6/1995 | Sugeno ........................ 429/342 |
| RE35,818 E | * | 6/1998 | Tahara et al. ................ 429/224 |
| 6,274,277 B1 | * | 8/2001 | Mori et al. .................. 429/307 |
| 6,355,379 B1 | * | 3/2002 | Ohshita et al. ............. 429/188 |
| 6,489,062 B1 | * | 12/2002 | Watanabe et al. ....... 429/231.95 |

OTHER PUBLICATIONS

Julien et al. Solid State Batteries: Materials Design and Optimization, "Inorganic Oxides". pp. 473–479.*

* cited by examiner

Primary Examiner—Laura Weiner
(74) Attorney, Agent, or Firm—Adams & Wilks

(57) ABSTRACT

A non-aqueous electrolyte rechargeable battery is resistant to the reflow temperature during reflow soldering. The non-aqueous electrolyte rechargeable battery has a positive electrode having an active material comprised of an oxide of molybdenum, a negative electrode comprised of lithium and SiO, an electrolytic solution comprised of a material containing a supporting salt and resistant to the reflow temperature during reflow soldering of the non-aqueous electrolyte rechargeable battery, and a gasket comprised of a compound selected from the group consisting of LCP, PEEK, PEN, and tetrafluoroethylene-perfluoroalkyl vinyl ether copolymer resin.

16 Claims, 6 Drawing Sheets

FIG. 6

Table 1

| | Positive electrode blend | | Negative electrode blend | | Li | Electrolytic solution | Gasket | Separator | Reflow characteristics | | Cycle characteristics | |
|---|---|---|---|---|---|---|---|---|---|---|---|---|
| | Active material | Wt. mg | Active material | Wt. mg | Wt. Mg | | | | Bulging | Internal resistance Ω | 1.8 V cut | Over discharge |
| C.Ex.1 | MnO$_2$ | 3.5 | Carbon | 2 | 0.13 | GBL/EC | PPS | Glass f. | × | × | × | × |
| C.Ex.2 | MoO$_3$ | 3.1 | WO$_2$ | 3.8 | 0.81 | PC/EC/DME | PPS | Glass f. | × | × | × | × |
| Ex. 1 | MoO$_3$ | 5 | WO$_2$ | 2.6 | 0.37 | GBL/EC | PPS | Glass f. | ○○ | ○○ | ○○ | ○○ |
| Ex. 2 | MoO$_3$ | 3.1 | WO$_2$ | 3.8 | 0.81 | GBL/EC | PPS | Glass f. | ○○ | ○○ | ○○ | ○ |
| Ex. 3 | MoO$_3$ | 5 | WO$_3$ | 2.6 | 0.37 | GBL/EC | PPS | Glass f. | ○○ | ○○ | ○○ | ○○ |
| Ex. 4 | MoO$_3$ | 3.1 | Carbon | 2 | 0.13 | GBL/EC | PPS | Glass f. | ○○ | ○○ | ○○ | ○ |
| Ex. 5 | MoO$_3$ | 5 | SiO | 2 | 0.75 | GBL/EC | PPS | Glass f. | ○○ | ○○ | ○○ | ○ |
| Ex. 6 | MoO$_2$ | 3.1 | WO$_2$ | 3.8 | 0.81 | GBL/EC | PPS | Glass f. | ○○ | ○○ | - | ○○ |
| Ex. 7 | MoO$_{2.5}$ | 3.1 | WO$_2$ | 3.8 | 0.81 | GBL/EC | PPS | Glass f. | ○○ | ○○ | - | ○○ |
| Ex. 8 | MoO$_{2.7}$ | 3.1 | WO$_2$ | 3.8 | 0.81 | GBL/EC | PPS | Glass f. | ○○ | ○○ | - | ○○ |
| Ex. 9 | MoO$_3$ | 3.1 | WO$_2$ | 3.8 | 0.81 | GBL/EC | PPS | Non-woven PPS | ○○ | ○○ | ○○ | ○ |
| Ex. 10 | MoO$_3$ | 5 | SiO | 2 | 0.75 | GBL/EC | PFA | Glass f. | ○○ | ○○ | ○○ | ○ |

NON-AQUEOUS ELECTROLYTE RECHARGEABLE BATTERIES

BACKGROUND OF THE INVENTION

1. Field of the Invention

The present invention refers to a coin-type (button-shaped) non-aqueous electrolyte rechargeable battery employing a substance capable of occluding and discharging lithium as the active material for the positive electrode and negative electrode, and a lithium ion conductive non-aqueous electrolyte, particularly, to a heat resistant non-aqueous rechargeable battery suitable for reflow soldering.

2. Background Information

The use of coin-type (button-shaped) non-aqueous rechargeable battery in the field of back-up power source for electronic devices is increasing because of its advantages such as high energy density, light weight, etc.

Most of the coin-type (button-shaped) non-aqueous rechargeable batteries known heretofore required an addition of lithium to the negative electrode in some form as an active material. For instance, in case of a battery using lithium-aluminum alloy for the negative electrode and a manganese oxide containing lithium of 3-V class for the positive electrode, lithium had to be pressure-welded to the negative electrode. In case of a battery using carbon for the negative electrode and a lithium-containing manganese oxide of 3-V class for the positive electrode, lithium had to be electrochemically inserted into the negative electrode.

In the batteries above, the selection of the material for the gasket which assures the air tightness and liquid tightness of the battery, as well as the insulation of the positive electrode and negative electrode cans is particularly important. Conventionally used as the gasket material is the inexpensive polypropylene, because of its advantages in resistance against chemicals, elasticity, creep resistance, and moldability which enables injection molding.

In case of using the batteries above mainly for memory back-up power sources, the terminals for use in soldering are welded to them, and are often soldered onto the printed wiring boards together with memory devices. Conventionally, soldering irons has been used for soldering the batteries to the printed wiring boards; however, with the recent requirements for more compact electronic devices which boast high functionality, there is a demand for increasing the number of electronic components to be mounted on the same area of the printed wiring board, and this made it difficult to afford a space for inserting the soldering iron. Furthermore, to reduce the production cost, automated soldering had been keenly demanded.

In the light of the aforementioned circumstances, there is employed a method comprising applying a solder cream and the like to the portion to be soldered and then mounting the components thereon, or a method comprising, after mounting the components on the board, supplying small beads to the soldering portions, and passing the thus mounted printed wiring board through a furnace whose atmosphere thereof is maintained at a high temperature set at a range of, for instance, 200 to 230° C., thereby allowing the solder to melt and accomplish the soldering (this method is referred hereinafter as "reflow soldering"). However, the coin-type (button-shaped) non-aqueous rechargeable battery of the conventional art had not been designed to use a heat-resistant material, and this disadvantageously led to the loss of its functionality as a battery during performing reflow soldering.

Most of the 3-V class coin-type (button-shaped) non-aqueous rechargeable batteries known heretofore employ a manganese oxide or a lithium-containing manganese oxide for the positive electrode and a material to which lithium is added in some form during the production process for the negative electrode. However, the material to which lithium is added in some form loses stability during the reflow soldering.

For instance, in a 3-V class coin-type (button-shaped) non-aqueous rechargeable battery using $Li_4Mn_5O_{12}$ as the lithium-containing manganese oxide for the positive electrode and a lithium-aluminum alloy for the negative electrode, the lithium alloy reacts with the electrolytic solution in almost any type of combinations of electrolytic solutions and the heat-resistant battery members as to cause abrupt bulging or explosion.

Similarly, in case of a 3-V class coin-type (button-shaped) non-aqueous rechargeable battery using $Li_4Mn_5O_{12}$ as the lithium-containing manganese oxide for the positive electrode and carbon doped with lithium either by contact doping or by electrochemical process for the negative electrode, the electrolytic solution undergoes reaction with the lithium-doped negative electrode as to cause abrupt bulging or explosion.

Furthermore, in a coin-type (button-shaped) non-aqueous rechargeable battery of the conventional type, no material resistant to the reflow temperature is used for the electrolytic solution, separator, or gasket. Thus, this lead to problems of causing, for instance, boiling or dissolution.

SUMMARY OF THE INVENTION

In the light of the aforementioned problems, the present invention utilizes a molybdenum oxide as the active material for the positive electrode. In particular, $MoO_3$ was found to be favorable because it has a high potential, and hence it allows setting the battery potential at a high value. Furthermore, there has been found a heat-resistant material for the electrolytic solution, separator, gasket, or other constituent elements of the batter which does not impair the battery performance even when combined with the electrode. This makes it possible to provide a coin-type (button-shaped) non-aqueous rechargeable battery resistant to the reflow temperature.

In the case of a coin-type (button-shaped) non-aqueous rechargeable battery using a manganese oxide or lithium-containing manganese oxide or the positive electrode and a lithium-aluminum alloy or carbon doped with lithium either by contact doping or by electrochemical process for the negative electrode, in almost all of the combinations of the electrolytic solution and the heat-resistant battery members, the electrolytic solution and the lithium alloy undergo reaction during the reflow soldering is to cause an abrupt bulging or explosion, and an increase in internal resistance. In the case of using a lithium alloy negative electrode, there was a tendency of increasing the internal resistance because the negative electrode becomes unstable during the alloying or the doping of lithium.

Further, in case of sealing the positive electrode alone inside the coin battery together with the electrolytic solution, no explosion occurs even if it is heated at the reflow temperature; however, there was found a tendency to cause bulging of the coin-shaped casing. Presumably, the combination of a negative electrode containing active lithium and the manganese oxide or the lithium-containing manganese oxide accelerates the abrupt bulging or explosion, or the increase in internal resistance.

As a result of studying various types of oxides for the positive electrode, it has been found that, only in case of using a molybdenum oxide in combination with a negative electrode containing lithium in some form, particularly by using $MoO_3$, a 3-V non-aqueous rechargeable battery can be stabilized specifically at the reflow temperature. The reason for this is not fully understood by principle, but the use of a molybdenum oxide for the positive electrode stabilizes the lithium-containing negative electrode at high temperatures as to considerably suppress the bulging of the battery and the increase in the internal resistance.

As the negative electrode, those which were extremely difficult for use in a battery produced by reflow process are now made usable. In case of using the negative electrode in a primary battery, metallic lithium can be used as it is. For secondary batteries, there can be used, for instance, a lithium alloy such as a lithium-aluminum, etc., or carbon doped with lithium, or a metallic oxide (e.g.e, SiO, $WO_2$, $WO_3$, doped with lithium.

Molybdenum oxide according to the present invention is stable at the reflow treatment temperature, and yet, it can reversibly occlude and discharge lithium.

Molybdenum oxides $MoO_x$ with x being in the range of from 2 to 3 (2 and 3 inclusive) can be used in the present invention. The potential becomes lower with x approaching 2, and is higher for x approaching 3. Although it is not fully understood by principle, the cycle degradation tends to become low with x approaching 2. Recently, there is a demand for a battery having wider range of charge voltage and of output power voltage due to the setting of the equipment supplied by the battery users. Since the battery voltage is determined by the potential difference between the positive electrode and the negative electrode, the charge voltage and the output power voltage can be controlled by changing the value of x of $MoO_x$ of the molybdenum oxide used for the negative electrode.

In case of carrying out the reflow soldering, it has been found that the use of a non-aqueous solvent having a boiling point of 200° C. or higher at the ordinary pressure results in a stable process at the reflow temperature. Although there is a case that the reflow temperature increases to about 250° C., no explosion of the battery occurred even when γ-butyrolactone (γBL) having a boiling point of 204° C. at the ordinary pressure was used for the electrolytic solution, probably because of the increase in pressure inside the battery. In the combination of the positive electrode and the negative electrode, it was found favorable to use propylene carbonate (PC), ethylene carbonate (EC), or γ-butyrolactone (γBL), either alone or as a composite thereof.

Furthermore, a polymer may be used in addition to the organic solvent above. As the polymer, there can be used those generally used in the art; preferably used are, for instance, polyethylene oxide (PEO), polypropylene oxide, bridged polyethylene glycol diacrylate, poly(vinylidene fluoride), bridged polyphosphazene, bridged polypropylene diacrylate, bridged polyethylene glycol methyl ether acrylate, bridged polypropylene glycol methyl ether acrylate, etc.

As the impurities mainly incorporated in the electrolytic solution (non-aqueous solvent), there can be mentioned water and an organic peroxide (e.g., a glycol, an alcohol, a carboxylate, etc.). Each of the aforementioned impurities is believed to form an insulating film on the surface of the graphitized substance as to increase the surface resistance of the electrode. This signifies that there is a fear of negatively affecting the cycle life and the capacity. Furthermore, this may increase self discharge when stored at high temperatures (60° C. or higher). Thus, it is preferred that the aforementioned impurities are reduced as much as possible in the electrolytic solution containing the non-aqueous solvent. More specifically, it is preferred that the water content is reduced to 50 ppm or lower, and the content of the organic peroxides is reduced to 1,000 ppm or lower.

As the supporting salts, there may be used one or more types of lithium salts (electrolytes) such as lithiumperchlorat ($LiClO_4$), lithiumpresphohexafluoride ($LiPF_6$), lithium borofluoride ($LiBF_4$), lithium arsenic hexafluoride ($LiAsF_6$), lithium trifluorometasulfonate ($LiCF_3SO_3$), bis (trifluoromethylsulfonyl)imidolithium [$LiN(CF_3SO_2)_2$], or a lithium salt of, e.g., thiocyanate, aluminum fluoride, etc. In carrying out the reflow soldering, it was found that a supporting salt containing fluorine, for instance, lithiumpresphohexafluoride ($LiPF_6$), lithium borofluoride ($LiBF_4$) or lithium trifluorometasulfonate ($LiCF_3SO_3$), is more stable, both thermally and electrically, than a chloride-based salt, such as $LiClO_4$. The content of the salt to be dissolved in the non-aqueous solvent is preferably in the range of from 0.5 to 3.0 mol/liter.

The solid electrolyte to be used in mixture with the polymer and the supporting salt is prepared by any method for solvent removal. More specifically, the method comprises, after dissolving the polymer and the supporting salt in acetonitrile or 1,2-dimethoxyethane, applying the resulting solution to the separator according to the present invention and drying. Otherwise, there may be employed a method comprising dispersing polypyrrole to a solution into which the supporting salt is dissolved, and removing the solvent thereafter. In case of a composite having a methacrylate ester as the framework (POE-PMMA), light may be used to irradiated the mixture of the monomer and the supporting salt to effect polymerization.

As the separator, there is used an insulating membrane having a large ion transmittance and a predetermined mechanical strength. As a material for use in the reflow soldering, glass fibers can be used most stable. However, there may be also used a resin having a thermal deformation temperature of 230° C. or higher, such as polyphenylene sulfide, polyethylene terephthalate, polyamide, polyimide, etc. The pore size of the separator is set in a range generally used in the batteries. For instance, pores 0.01 to 10 μm are used. The separator is used at a thickness generally used in the art for batteries, for instance, in the range of from 5 to 300 μm.

For the gasket, generally used is polypropylene or the like. However, in case of carrying out reflow soldering, resins having a thermal deformation temperature of 230° C. or higher, such as polphenylene sulfide, polyethylene terephthalate, polyamide, liquid crystal polymer (LCP), tetrafluoroethylene-perfluoroalkyl vinyl ether copolymer resin (PFA), polyether ether ketone resin (PEEK), polyether nitrile resin (PEN), etc, have found to be free of explosions and the like at the reflow temperature, and yet, have found no problems such as a leakage of solution due to the deformation of the gasket even during the storage thereof after the reflow treatment.

In addition to the resins above, there can also be used polyether ketone resin (PEK), polyarylate resin, polybutylene terephthalate resin, polycyclohexanedimetylene terephthalate resin, polyether sulfone resin, polyaminobismaleimide resin, polyetherimideresin,orafluororesin. Amaterialcontaining 10% by weight or less of glass fibers, mica whiskers, fine ceramic powders, etc., is experimentally confirmed to realize a similar effect obtained in the present experiment.

As the method for producing the gasket, usable are an injection molding method, a thermal compression method, etc.

The injection molding method is the most generally known method for molding a gasket. However, in case of reducing the production cost at the sacrifice of molding precision, it is essential to assure air tightness by using a liquid sealing agent.

The thermal compression method comprises using, as a primary gasket molding, a sheet material thicker than the final product obtained as the product, and applying thermal compression shaping to obtain the final product.

In general, in case of elevating the temperature of a thermoplastic resin molding obtained by thermal compression method at a temperature not higher than the melting point of the material, the material tends to recover the shape of the primary molding. By taking advantage of the characteristics above, the interstice that is originally formed between the external and internal casings (which is made of metal) and the gasket (which is made of resin), or the loss of sufficiently high stress between the casings and the gasket, the non-aqueous rechargeable battery employing the gasket can be implemented with sufficiently high air tightness between the external and internal casings ((which is made of metal) and the gasket (which is made of resin) or with sufficiently high stress between the casings and gasket.

Furthermore, since the molding thus obtained tends to recover its shape with the passage of time, the same effect can be obtained in batteries obtained by a method not employing reflow soldering.

In particular, a gasket using tetrafluoroethylene-perfluoroalkyl vinyl ether copolymer resin (PFA) prepared by the compression method, which comprises applying pressure to a sheet-like material while heating, was found to exhibit superior sealing properties as compared with such prepared by injection molding method. This is ascribed to the fact that PFA exhibits rubber elasticity, and that the product obtained by thermal compression tends to recover its original thickness at the reflow temperature as compared with the injection molded product which undergoes shrinking at the reflow temperature. Thus, the internal pressure at the sealed portion increases as to further achieve air tightness.

In case of a coin-type or button-shaped battery, an asphalt pitch, a butyl rubber, a fluorine-based oil, a chlorosulfonated polyethylene, an epoxy resin, etc., is used either alone or as a mixture thereof as a liquid sealing agent. If the liquid sealing agent is transparent, it is colored to clearly show the presence of coating. As a method for coating the sealing agent, there are used, for example, injecting the sealing agent to the gasket, coating the positive electrode and negative electrode casings, dipping the gasket into the solution of the sealing agent, etc.

In case the battery is shaped into a coin or a button, the electrode is shaped into a pellet by compressing the blend containing the positive electrode active material or the negative electrode active material. If the battery is shaped into a thin coin or button, the electrode may be punched out from a sheet-like shaped material. The thickness and the diameter of the pellet are determined depending on the size of the battery.

The pressing method of the pellet can be selected from the methods generally employed in the art, but particularly preferred is the pressing method using a metal mold. The pressure applied at the pressing is not particularly limited, but preferred is to apply a pressure in the range of from 0.2 to 5 t/cm². The temperature during pressing is preferably set in the range from room temperature to 200° C.

An electrically conductive agent, a binding agent, a filler, etc., may be added to the blended material for the electrode. The type of the electrically conductive agent is not particularly limited, and while allowing the used of a metallic powder, particularly limited are those based on carbon. A carbon material is the most common material, and used are, for instance, naturally occurring graphite (flaky graphite, scaly graphite, earthy graphite, etc.), artificial graphite, carbon black, channel black, thermal black, furnace black, acetylene black, carbon fibers, etc. As a usable metal, there can be used metallic powders and metallic fibers of, for instance, copper, nickel, silver, etc. Also usable are electrically conductive polymers.

The amount of carbon to be added is not particularly limited, and depends on the electric conductivity of the active material, the shape of the electrode, etc. However, in case of a negative electrode, carbon is preferably added at a concentration of 1 to 50% by weight, and particularly preferably, in an amount of 2 to 40% by weight.

The particle size of carbon is from 0.5 to 50 μm in mean diameter, preferably from 0.5 to 15 μm in mean diameter. By setting the particle size in a more preferred range of from 0.5 to 6 μm in mean diameter, good contact between the active materials can be assured as to improve the network forming properties to assure electron conductivity, thus reducing the amount of active material not participating in the electrochemical reaction.

As the binding agent, although not particularly limited, preferred are those insoluble to the electrolytic solution. In general, used are those selected from polysaccharides, thermoplastic resins, thermosetting resins, polymers having the rubber elasticity, etc., either alone or as a mixture thereof; more specifically, such as polyacrylic acid or a neutralized polyacrylic acid, poly(vinyl alcohol), carboxymethyl cellulose, starch, hydroxypropyl cellulose, regenerated cellulose, diacetyl cellulose, poly(vinyl chloride), poly(vinyl pyrrolidone), tetrafluoroethylene, poly(vinylidene fluoride), polyethylene, polypropylene, ethylene-propylene-diene polymer (EPDM), sulfonated EPDM, styrene butadiene rubber, polybutadiene, fluorine rubber, poly(ethylene oxide), polyimide, epoxy resin, phenolic resin, etc. The amount of addition of the binding resin is not particularly limited, but preferred is to add in the range of from 1 to 50% by weight.

As the filler, there can be used any fibrous material so long as it does not undergo chemical change inside the constitution of the battery. In the present invention, used are fibers of carbon, glass, etc. The amount of addition of the filler is not particularly limited, but preferred is a range of from 0 to 30% by weight.

As the collector for the electrode active material, preferably used are metallic plates having low electric resistance. For the positive electrode, in addition to the materials such as stainless steel, nickel, aluminum, titanium, tungsten, gold, platinum, sintered carbon, etc., also used are aluminum or stainless steel whose surface is treated with carbon, nickel, titanium, or silver. As the stainless steel, two-phase stainless steel is effective as an anti-corrosive material. In case of coin or button battery, nickel plating is applied to the side corresponding to the outer side. As a method of treatment, there can be used, for instance, wet plating, dry plating, CVD, PVD, cladding by pressure welding, coating, etc.

As the negative electrode, usable materials include, in addition to the materials such as stainless steel, nickel, copper, aluminum, titanium, tungsten, gold, platinum, sintered carbon, etc., aluminum or stainless steel whose surface is treated with carbon, nickel, titanium, or silver, or an Al—Cd alloy. Usable as a method of treatment are, for instance, wet plating, dry plating, CVD, PVD, cladding by pressure welding, coating, etc.

The electrode active material may be fixed to the collector by using an electrically conductive adhesive. As an electrically conductive adhesive, there can be used a material obtained by adding, into a resin dissolved in a solvent, powders or fibers of carbon or a metal, or by dissolving an electrically conductive polymer into the solvent.

In case of an electrode shaped into a pellet, the adhesive is applied between the collector and the pellet electrode to fix the electrode. The electrically conductive adhesive mostly contain a thermosetting resin.

The usage of the non-aqueous rechargeable battery according to the present invention is not particularly limited; however, it can be used as a back-up power source of portable phones, pagers, etc., or as a power source of wrist watches equipped with generator functions, etc.

The battery according to the present invention is preferably assembled under a moisture-free atmosphere or under an inert gas atmosphere. Furthermore, the components to be assembled are preferably dried prior to the assembling. As a method for drying or dehydrating the pellets, sheets, and other components, there can be employed a method generally employed in the art. In particular, preferred is to employ methods using hot air, vacuum, infrared radiation, far infrared radiation, electron beam, or air reduced in moisture, either alone or as a combination thereof. The temperature is preferably set in the range of from 80 to 350° C., and particularly preferred is the range of from 100 to 250° C. The water content is preferably 2,000 ppm or lower with respect to the entire battery; and for the positive electrode blend, negative electrode blend, and the electrolyte, the water content of each of them is preferably set to 50 ppm or less from the viewpoint of improving the charge and discharge cycle properties.

Particularly effective is heating the pellet itself, and in this case, a temperature range of from 180 to 280° C. is preferred. The proper duration of heating is 1 hour or longer, and the atmosphere can be selected from vacuum, air, or inert gas. The heating temperature must be set as such that it might be not lower than the reflow soldering temperature, and the heating condition must be determined by taking the strength of the organic binding agent into consideration. By thus heating each of the members to a temperature not lower than the reflow soldering temperature prior to their assembling, the occurrence of an abrupt reaction can be suppressed even if the battery is exposed to the reflow soldering temperature. Furthermore, by heating, the impregnability of the electrolytic solution into the pellets can be improved, resulting in an extremely advantageous effect in implementing a battery having improved battery characteristics as in the case of the present invention in which a highly viscous electrolytic solution is used at high temperatures.

BRIEF DESCRIPTION OF THE DRAWINGS

FIG. 6 is a table showing the characteristics of Comparative Examples 1 and 2 and Examples 1–10.

DETAILED DESCRIPTION OF THE PREFERRED EMBODIMENTS

The present invention is described in further detail by making reference to the non-limiting examples as follows.

EXAMPLE 1

Figure 1:
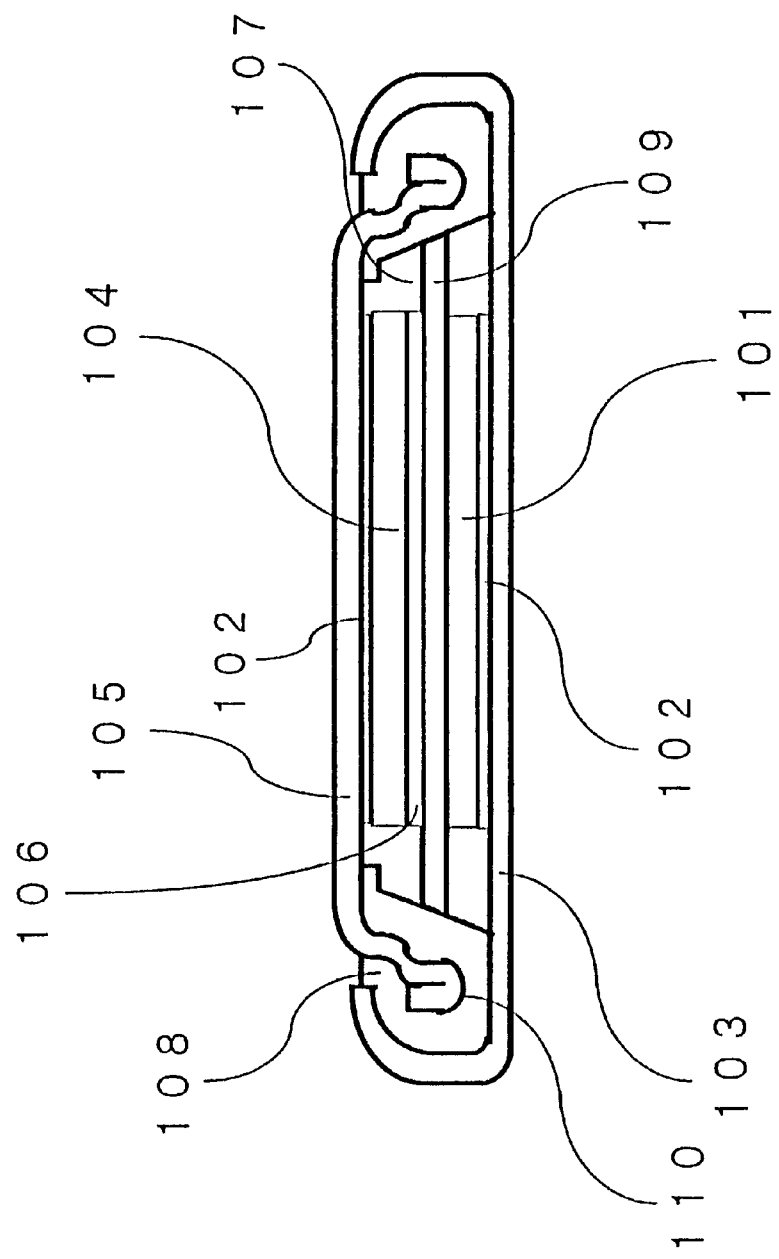
FIG. 1 is a cross section view of a coin-type lithium secondary battery according to the present invention.

The present example shows a case using $MoO_3$ as the positive electrode active material and $WO_2$ as the negative electrode active material. A positive electrode, a negative electrode, and an electrolytic solution described below were used. The finally obtained battery was 4.8 mm in outer diameter and 1.4 mm in thickness. In FIG. 1 is shown the cross section view of the battery.

In Example 1, the positive electrode was produced as follows. After crushing a commercially available $MoO_3$, graphite as an electrically conductive agent and polyacrylic acid as a binding agent were added thereto to obtain a positive electrode activating agent containing $MoO_3$, graphite, and polyacrylic acid at a ratio by weight of 53:45:2. Then, 5 mg of the thus obtained positive electrode activating agent was pressure molded into a pellet 2.4 mm in diameter by applying a pressure of 2 ton/cm$^2$. The positive electrode pellet 101 thus obtained was adhered to a positive electrode casing 103 by using an electrode collector 102 made of an electrically conductive resin adhesive containing carbon to obtain a monolithic body (positive electrode unit), which was heated and dried at 250° C. under reduced pressure for a duration of 8 hours.

The negative electrode was produced as follows. A commercially available $WO_2$ was crushed for use as an active material of the functional electrode. To the resulting active material, graphite as an electrically conductive agent and polyacrylic acid as a binding agent were added to obtain a negative electrode blend containing $WO_2$, graphite, and polyacrylic acid at a ratio by weight of 45:40:15. Then, 2.6 mg of the thus obtained negative electrode blend was pressure molded into a pellet 2.4 mm in diameter by applying a pressure of 2 ton/cm$^2$. The negative electrode pellet 104 thus obtained was adhered to a negative electrode casing 105 by using an electrode collector 102 made of an electrically conductive resin adhesive containing carbon as an electrically conductive filler to obtain a monolithic body (negative electrode unit), which was heated and dried at 250° C. under reduced pressure for a duration of 8 hours. Then, a lithium foil 106 punched out into a diameter of 2 mm and a thickness of 0.22 mm was pressure molded to the upper surface of the pellet to obtain a lithium-layered negative electrode pellet. A non-woven cloth of glass fibers 0.2 mm in thickness was dried and a separator 109 having a diameter of 3 mm was punched out therefrom. A gasket 108 made of PPS was prepared. For an electrolytic solution 107, lithium borofluoride ($LiBF_4$) was dissolved at a concentration of 1 mol/liter to a 1:1 ratio by volume mixed solvent of ethylene carbonate (EC) and γ-butyrolactone (γBL). Thus, 6 μL of the thus obtained electrolytic solution was placed into the battery casing. A battery was obtained by superposing the positive electrode unit and the negative electrode unit, and by airtight sealing them by caulking.

EXAMPLES 2 to 13

Batteries were prepared in the same manner as that described in Example 1, except for using other types of active materials, electrolytic solutions, and battery members. Then, evaluation was made on the resulting products.

The mixing ratio of the positive electrode blend and the negative electrode blend was the same as those described in Example 1. However, in Comparative examples and in Example 4, the carbon to polyacrylic acid mixing ratio of the negative electrode blend using carbon (a commercially available product having a capacity of 350 mAh/g) as the negative electrode active material was changed to 90:10.

Referring to Table 1 in FIG. 6, the notation "GBL/EC" represents a 1:1 mixture of GBL and EC, and the notation "$LiBF_4$ 1 mol/L, PC/EC/DME" represents an electrolytic solution containing 1 mol/L of $LiBF_4$ in a 1:1:1 mixture of PC, EC, and DME.

Then, 10 units each of the batteries thus produced were tested whether they resist to the reflow temperature. Thus, reflow test was performed by pre-heating the batteries at a temperature of 180° C. for a duration of 10 minutes, followed by heating at 240° C. for a duration of 1 minute. To investigate whether they bulged or not, the height, the internal resistance, and the cycle properties were each measured on the heated samples. The height was measured by using a dial gauge. The internal resistance was measured by means of alternating current method at a frequency of 1 kHz. The cycle characteristics was investigated by a constant current and constant voltage method under charge-discharge conditions as such by charging at a maximum current of 0.05 mA, a constant voltage of 3.3 V, and a charging duration of 20 hours, while discharging at a constant current of 0.025 mA to a final voltage of 1.8 V (for Examples 6, 7, and 8, to a final voltage of 0.7 V). For the over discharge cycles, the final voltage was set at 0 V.

The results thus obtained are shown in Table 1.

In Table 1, the symbol ⊙⊙ represents that the sample exhibits excellent characteristics, ○ represents that the sample has no problem in its practical use and × represents that the sample exhibits problematic characteristics for a practical use.

The sample in Comparative Example 1 using manganese dioxide $MnO_2$ for the positive electrode showed bulging of 0.1 mm or more at the reflow test, and 6 samples out of 10 underwent explosion. Although not shown in Table 1, the samples using a 3-V class lithium-containing manganese oxide $Li_4Mn_5O_{12}$ were found to be not in the practical level since they also showed bulging at the reflow test. Furthermore, a large increase in internal resistance was found as such that the average value before the reflow test of 235Ω increased to 1890Ω (an average value for those which did not exploded). The batteries of the Comparative examples showed almost no charging and discharging. It was found that the positive electrodes based on manganese oxide were not suitable as a battery material resistant to reflow treatment.

Similarly, Comparative Example 2 using a 1:1:1 mixture of PC, EC, and DME containing dissolved therein 1 mol/L of $LiBF_4$ as the electrolytic solution showed unfavorable characteristics after the reflow treatment. Almost all of the samples were found that they had underwent explosion during the reflow test. This is presumed due to the incorporation of a low boiling solvent, DME (dimethyl ether) in the electrolytic solution, which caused an abrupt volume expansion at the reflow temperature.

All of the bulging which occurred on the batteries obtained in Examples 2 to 13 were found to be 0.03 mm or less, which is of no problem in practical use. Considering the internal resistance, all of the values measured after the reflow test fell within ±20% of the initial value measured before performing the test.

Figure 2:
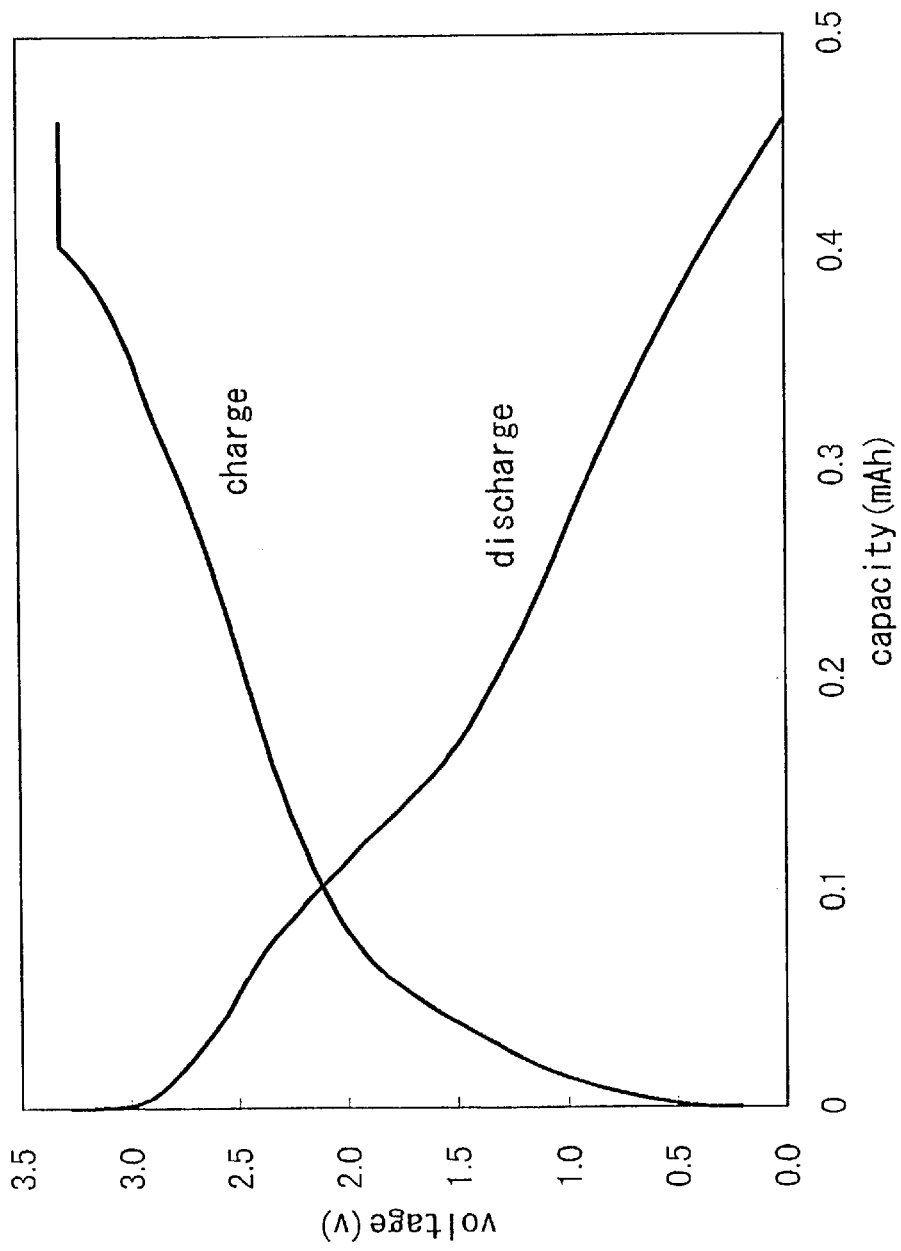
FIG. 2 is a diagram showing the charge-discharge characteristics of a battery according to Example 1.
Figure 3:
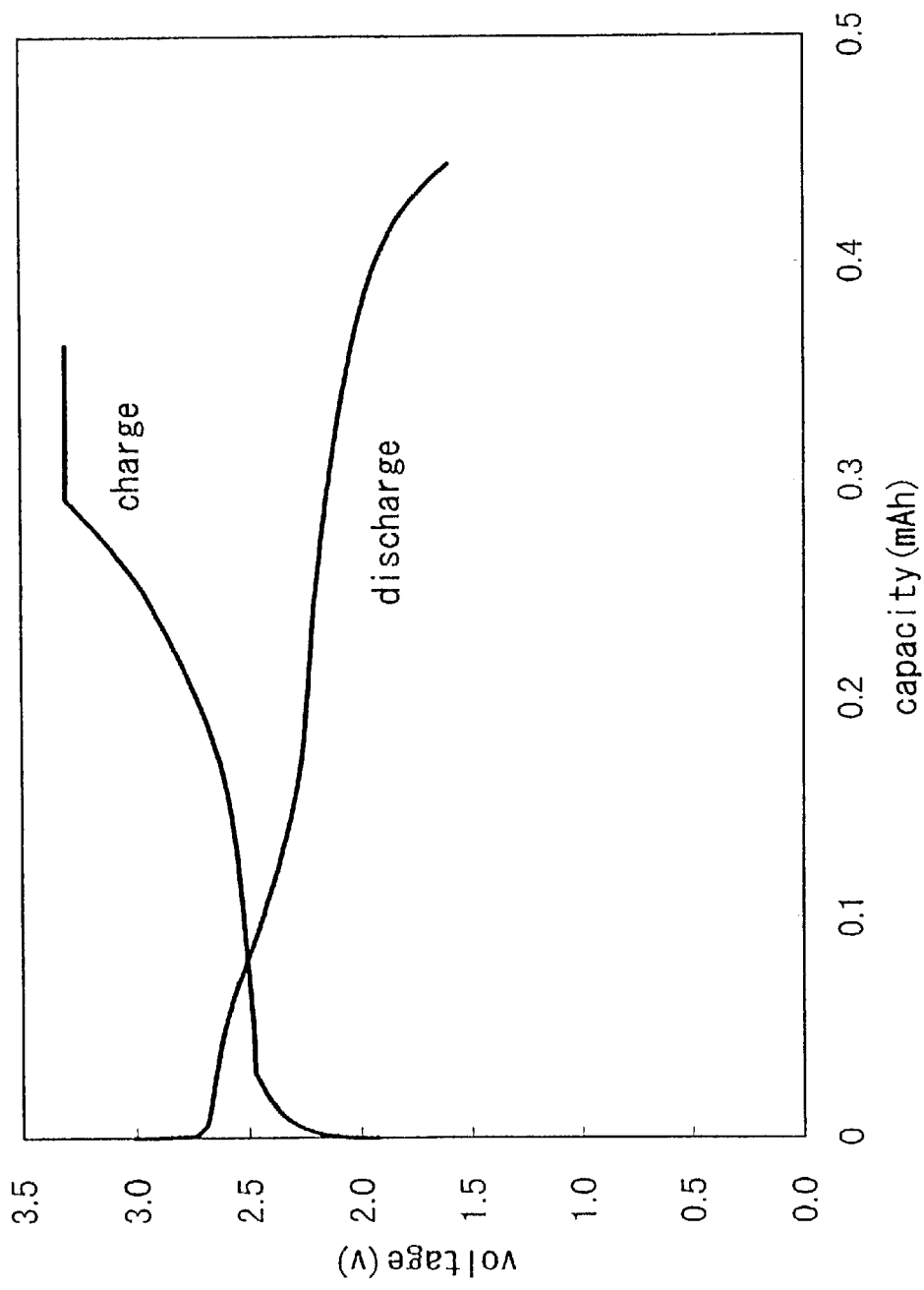
FIG. 3 is a diagram showing the charge-discharge characteristics of a battery according to Example 2.

In FIG. 2 is given the charge-discharge characteristic curve for the sample obtained in Example 1, and in FIG. 3 is given the same for the sample obtained in Example 2. The difference between Example 1 and Example 2 is the balance in capacity of the positive electrode and the negative electrode. In case of Example 1, in which the capacity of the positive electrode is set higher, it can be understood that a favorable cycle characteristics are obtained despite of the low capacity as a whole. In case of Example 2, on the contrary, it can be understood that although a high capacity is obtained, the over discharge cycle characteristics results somewhat inferior as compared with that of Example 1. This is a problem depending on the cycle characteristics of $MoO_3$, and, with reference to Example 1, the cycle degradation can be reduced by designing the battery with a higher allowance in the capacity of the positive electrode.

Figure 4:
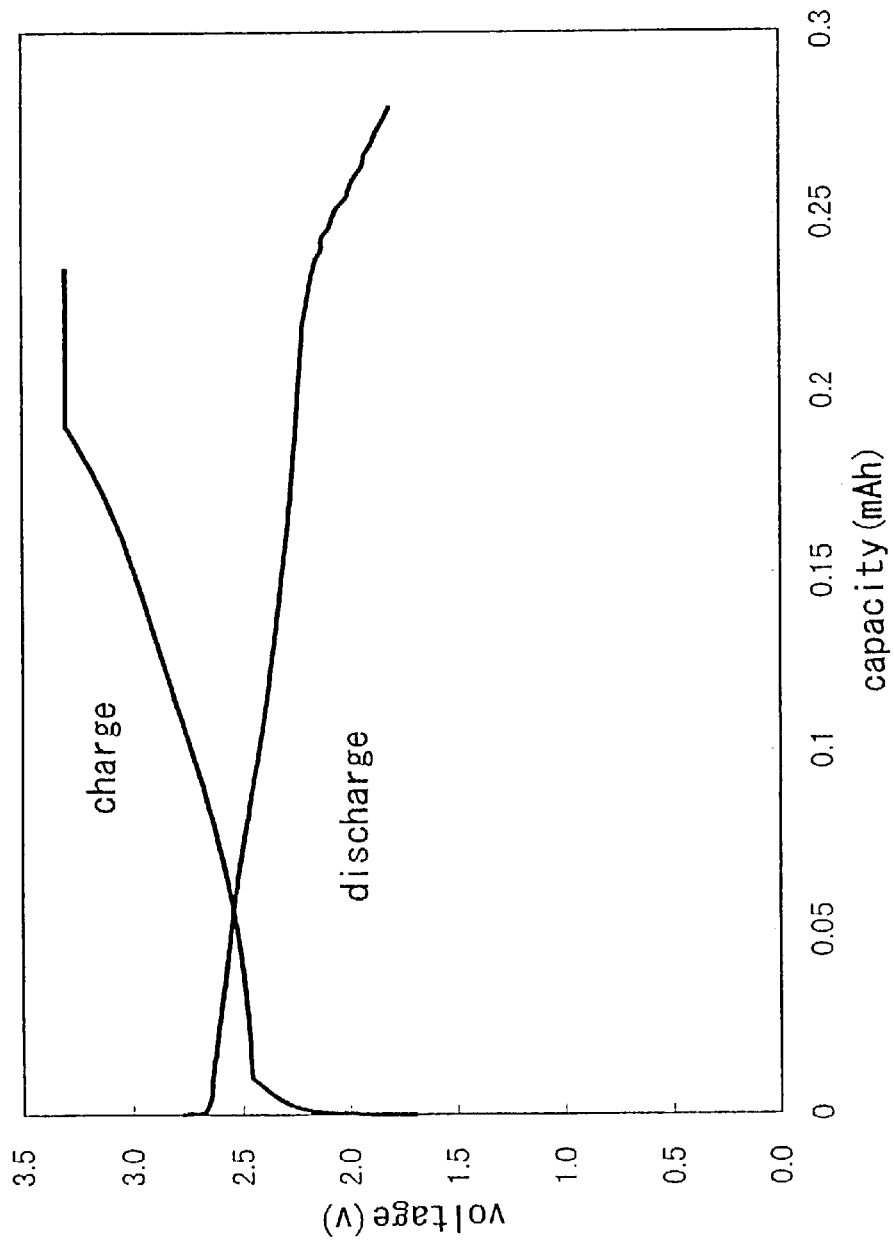
FIG. 4 is a diagram showing the charge-discharge characteristics of a battery according to Example 4.
Figure 5:
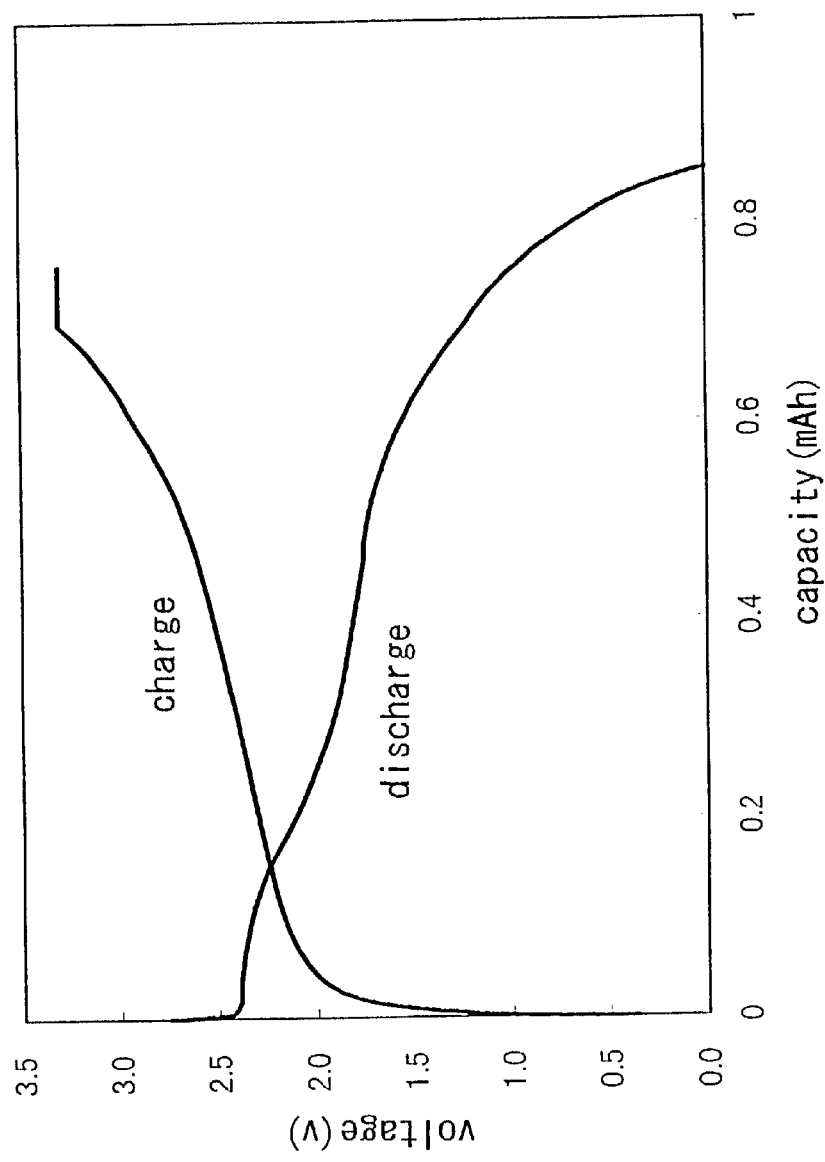
FIG. 5 is a diagram showing the charge-discharge characteristics of a battery according to Example 5.

As shown in Examples 3, 4, and 5, favorable results were similarly obtained in cases using $WO_3$, carbon, and SiO. In FIG. 4 is shown the charge-discharge curve for a case using carbon as the negative electrode. Although carbon negative electrode yields a low capacity as compared with other oxide negative electrodes, the voltage of the entire battery can be set higher because of its low potential. It can be understood from FIG. 4 that the capacity is higher in the range of 2 V or higher. In FIG. 5 is shown the charge-discharge curve for a case using SiO as the negative electrode. It can be read from FIG. 5 that the use of SiO enables a battery design that boasts high capacity.

In the case of using molybdenum oxides as in Examples 6, 7, and 8, the battery voltage was lower for decreasing content of oxygen. All of them showed superior over discharge cycle characteristics as compared with the case using $MoO_3$.

Example 9 refers to a battery using non-woven PPS as the separator. The same characteristics as those obtained for the samples in Example 2 were obtained. It was confirmed that a non-woven PPS resists to reflow soldering.

In Example 10, a battery using PFA for the gasket was produced. The gasket was prepared by compression molding. The characteristics were the same as those obtained on the samples of Example 5. Thus, it was confirmed that a PFA gasket resists to reflow soldering. Furthermore, since a favorable air tightness is assured at the sealing, there was no need of applying a liquid sealing agent to the gasket.

In Examples 11 to 13, batteries were produced by using LCP, PEEK, and PEN for the gasket. The same characteristics as those of Example 5 were obtained, and was confirmed that those gaskets also resist to reflow soldering.

As described above, by using a molybdenum oxide for the positive electrode active material, the present invention enables heat resistant non-aqueous rechargeable batteries well resistant against reflow soldering.

Furthermore, by using $MoO_3$ as the molybdenum oxide, a heat resistant non-aqueous rechargeable battery capable of yielding a further higher voltage and higher capacity is provided.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A non-aqueous electrolyte rechargeable battery resistant to the reflow temperature during reflow soldering, the non-aqueous electrolyte rechargeable battery comprising: a positive electrode having an active material comprised of an oxide of molybdenum; a negative electrode comprised of lithium and SiO; a non-aqueous solvent; an electrolytic solution comprised of a material containing a supporting salt and resistant to the reflow soldering temperature; a separator comprised of a material resistant to the reflow soldering temperature; and a gasket comprised of a material resistant to the reflow soldering temperature and selected from the group consisting of a liquid crystal polymer, polyether ether ketone resin, polyether nitrile resin, and tetrafluoroethylene-perfluoroalkyl vinyl ether copolymer resin.

2. A non-aqueous electrolyte rechargeable battery as claimed in claim 1; wherein the oxide of molybdenum comprises $MoO_3$.

3. A non-aqueous electrolyte rechargeable battery as claimed in claim 1; wherein the non-aqueous solvent has a boiling point of 200° C. or higher under ambient pressure.

4. A non-aqueous electrolyte rechargeable battery as claimed in claim 3; wherein the supporting salt contains fluorine.

5. A non-aqueous electrolyte rechargeable battery as claimed in claim 3; wherein the separator is comprised of glass fibers.

6. A non-aqueous electrolyte rechargeable battery as claimed in claim 3; wherein the separator is comprised of a resin having a thermal deformation temperature of 230° C. or higher.

7. A non-aqueous electrolyte rechargeable battery as claimed in claim 6; wherein the resin comprises a compound selected from the group consisting of polyphenylene sulfide, a liquid crystal polymer, polyether ether ketone resin, polyether nitrile resin, and tetrafluoroethylene-perfluoroalkyl vinyl ether copolymer resin.

8. A non-aqueous electrolyte rechargeable battery as claimed in claim 1; wherein the non-aqueous solvent comprises one of ethylene carbonate (EC) and γ-butyrolactone (γ-BL) or a composite thereof; and wherein the supporting salt comprises one of lithium phosphohexafluoride ($LiPF_6$) and lithium borohexafluoride ($LiBF_4$) or a composite thereof.

9. A non-aqueous electrolyte rechargeable battery according to claim 1; wherein the oxide of molybdenum is represented by the chemical formula $MoO_x$, where $2 \leq x \leq 3$.

10. A non-aqueous electrolyte rechargeable battery resistant to the reflow temperature during reflow soldering, the non-aqueous electrolyte rechargeable battery comprising: a positive electrode having an active material comprised of an oxide of molybdenum; a negative electrode comprised of lithium and SiO; an electrolytic solution comprised of a material containing a supporting salt and resistant to the reflow soldering temperature; and a gasket comprised of a compound selected from the group consisting of a liquid crystal polymer, polyether ether ketone resin, polyether nitrile resin, and tetrafluoroethylene-perfluoroalkyl vinyl ether copolymer resin.

11. A non-aqueous electrolyte rechargeable battery as claimed in claim 10; wherein the oxide of molybdenum comprises $MoO_3$.

12. A non-aqueous electrolyte rechargeable battery as claimed in claim 10; further comprising a separator comprised of a heat resistant material.

13. A non-aqueous electrolyte rechargeable battery as claimed in claim 12; wherein the heat resistant material comprises glass fibers or a resin having a thermal deformation temperature of 230° C. or higher.

14. A non-aqueous electrolyte rechargeable battery according to claim 10; wherein the oxide of molybdenum is represented by the chemical formula $MoO_x$, where $2 \leq x \leq 3$.

15. A non-aqueous electrolyte rechargeable battery resistant to the reflow temperature during reflow soldering, the non-aqueous electrolyte rechargeable battery comprising: a positive electrode having an active material comprised of an oxide of molybdenum; a negative electrode comprised of lithium and SiO; a non-aqueous solvent; an electrolytic solution comprised of a material containing a supporting salt and resistant to the reflow soldering temperature; a separator comprised of a material resistant to the reflow soldering temperature; and a gasket comprised of a material resistant to the reflow soldering temperature and having a thermal deformation temperature of 230° C. or higher.

16. A non-aqueous electrolyte rechargeable battery according to claim 15; wherein the resin comprises a compound selected from the group consisting of polyphenylene sulfide, a liquid crystal polymer, polyether ether ketone resin, polyether nitrile resin, and tetrafluoroethylene-perfluoroalkyl vinyl ether copoly-mer resin.

* * * * *